(Model.)
W. W. SPEER.
Cultivator Tooth.
No. 242,390. Patented May 31, 1881.
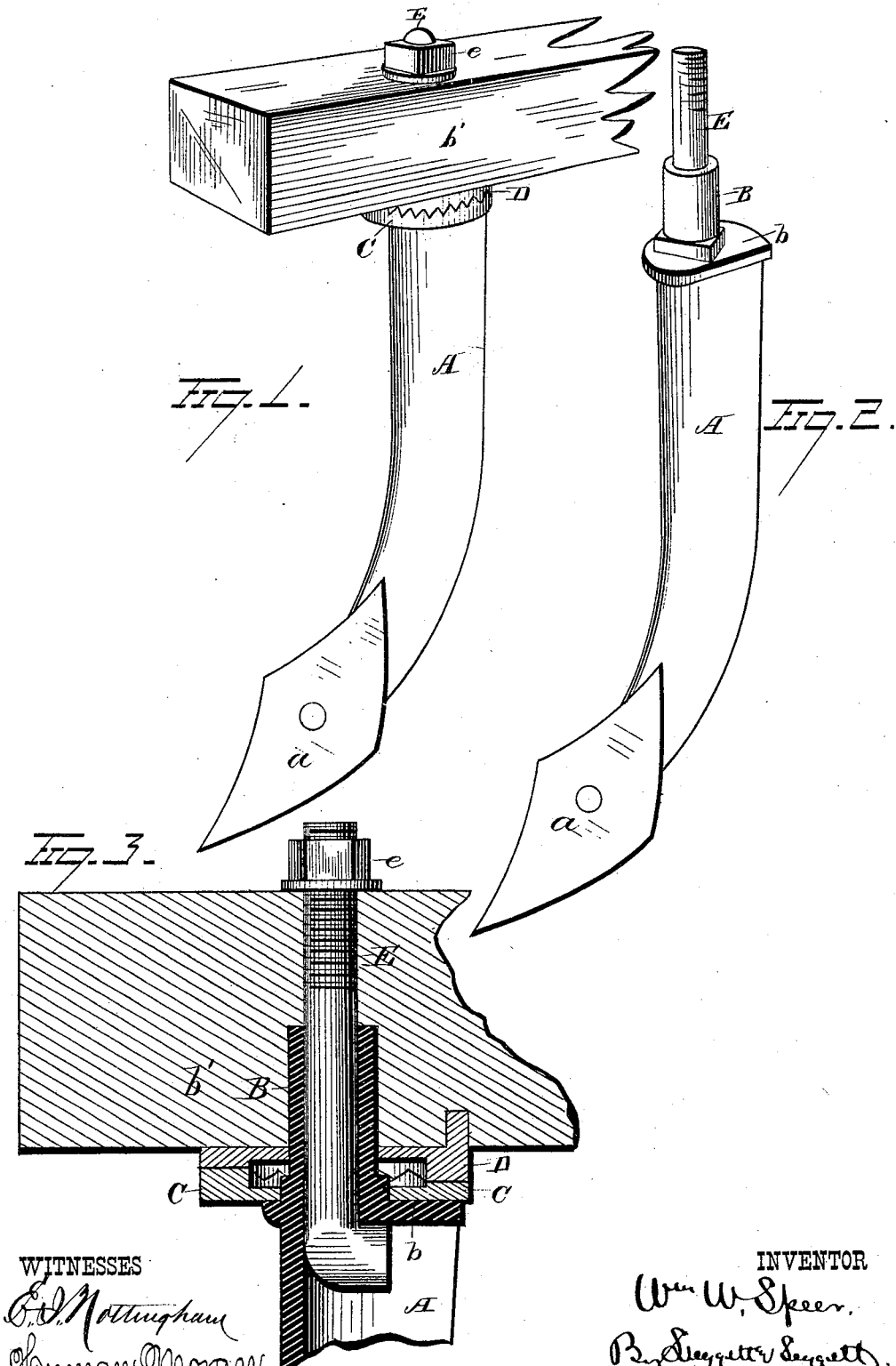

UNITED STATES PATENT OFFICE.

WILLIAM W. SPEER, OF PITTSBURG, PENNSYLVANIA.

CULTIVATOR-TOOTH.

SPECIFICATION forming part of Letters Patent No. 242,390, dated May 31, 1881.

Application filed April 7, 1881. (Model.)

*To all whom it may concern:*

Be it known that I, WILLIAM W. SPEER, of Pittsburg, in the county of Allegheny and State of Pennsylvania, have invented certain new and useful Improvements in Cultivator-Teeth; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in cultivator-teeth, the object of the same being to provide simple and efficient means for securing the same to the frame; and it consists in certain details in construction and combinations of parts, as will be more fully explained, and pointed out in the claim.

In the accompanying drawings, Figure 1 is a perspective view of my improved device as applied to a section of a frame. Fig. 2 is a view of the tooth; and Fig. 3 is a vertical section of the upper part of the tooth, showing the manner of securing same to the frame.

A represents the tooth, to the lower end of which is secured the reversible point $a$ by screw and nut.

B is the hollow shank formed above the shoulder $b$. That portion of the shank lying immediately on the shoulder $b$ is formed triangular or square, and is adapted to receive the serrated disk C, having an opening of the same size and shape as the shank at this point, which prevents the disk from turning thereon. The serrations in this disk face upward and mesh with the serrated disk D, the latter being secured to the under side of the cultivator-frame $b'$ in any suitable manner. The remaining or rounded portion of the shank enters the frame through this latter disk D, and assists in strengthening the tooth, while the same is prevented from turning laterally by the serrated disk C on the square portion of shank B meshing with the disk D secured to the upper part of the frame.

In the drawings I have shown projections cast on the back of disk D, which enter recesses in the frame and hold the disk D securely thereon; but instead thereof I may secure said disk to the frame in any suitable manner.

The shank B of the tooth is adapted to form a bearing for the bolt E, assist in holding the tooth in place, and form a bearing for a rated disk, the latter engaging with the serrated disk secured to the under side of the cultivator-frame, or to serrations in the frame itself. The serrations prevent the tooth from turning after it has been secured in place. The shank projects into a recess of sufficient size formed in the frame for its reception, and is retained in position by the bolt E, which passes up through the same, the latter having an enlarged head at one end which prevents its withdrawal from the tooth, and screw-threads and nut at the other end by which the shank is held up in the recess in the frame.

From the foregoing it will be seen that by unscrewing the nut $e$ the tooth is allowed to descend, which separates the serrated faces of the disks C and D, (the former on the square shoulder of the shank and the latter attached to the bottom of the frame,) which allows the tooth to be turned laterally, so that the point will project in a straight line or to either side, as desired, where it can be secured by bringing the serrated faces of the disks together and securing the same in position by the nut.

The shank B, by entering the cultivator-frame, forms a long bearing for the tooth, takes most of the strain from the bolt, and allows a greater amount of power or pressure to be exerted thereon without damage, while the bolt holds the same in place, and also assists the shank in holding the tooth in position.

I am aware that cultivator-teeth have been constructed with hollow shanks for their attachment to the frame by means of bolts. Further, I am aware that serrated disks have been used in agricultural implements for the purpose of securing different parts in desired adjustment, and hence I make no broad claim to either feature referred to, as my invention consists in certain novel combinations and arrangement of parts, as will be specified in the claim.

Having fully described my invention, what I claim as new, and desire to secure by Letters Patent, is—

The combination, with a cultivator-tooth having a tubular shank and an angular-shaped bearing and a fastening-bolt extending through said tubular or hollow shank, of two serrated disks located on the tubular shank between the upper end of the cultivator tooth and frame, one of said disks provided with a lug which extends into the frame, and the other with an angular-shaped opening which fits the angular bearing on the lower portion of the tubular shank, substantially as set forth.

In testimony that I claim the foregoing I have hereunto set my hand this 1st day of April, 1881.

WILLIAM W. SPEER.

Witnesses:
HENRY C. BURHOUP,
THOMAS D. GRAHAM.